United States Patent [19]
Kawagoe

[11] Patent Number: 6,119,158
[45] Date of Patent: Sep. 12, 2000

[54] METHOD OF FORMING MULTI-INTEGRATED AGENT SYSTEM

[75] Inventor: Teruyuki Kawagoe, Tokyo, Japan

[73] Assignee: NEC Corporation, Tokyo, Japan

[21] Appl. No.: 08/978,584

[22] Filed: Nov. 26, 1997

[30] Foreign Application Priority Data

Nov. 29, 1996 [JP] Japan ..................................... 8-319641

[51] Int. Cl.[7] .............................................. G06F 15/173
[52] U.S. Cl. ........................................... 709/223; 709/224
[58] Field of Search .................................... 709/200, 224, 709/223; 370/408

[56] References Cited

U.S. PATENT DOCUMENTS

| | | | |
|---|---|---|---|
| 5,621,892 | 4/1997 | Cook ....................................... | 709/224 |
| 5,651,006 | 7/1997 | Fujino et al. ........................... | 709/223 |
| 5,978,845 | 11/1999 | Reisacher ................................ | 709/223 |
| 5,980,078 | 11/1999 | Krivoshein et al. .................... | 364/131 |
| 5,987,516 | 11/1999 | Rao et al. ................................ | 70/227 |

*Primary Examiner*—Zarni Maung
*Attorney, Agent, or Firm*—Sughrue, Mion, Zinn, Macpeak & Seas, PLLC

[57] ABSTRACT

There is provided a method of making-up a multi-integrated agent system which can improve maintainability and operationability of network management. A network management system and a network element constitute the multi-integrated agent system. A management information data base of the network management system and a CPU board of the network element hold structural information including a NMS-ID indicative of information for identifying the network management system, time stamp information indicative of a time point at which the network management system connects to the network element and a unit ID indicative of information for identifying the network element. When the system is made-up, the network management system collects the structural information from the network element and compares it with the structural information of its own at a comparator unit and executes a proper makeup procedure in accordance with a result of comparison.

4 Claims, 8 Drawing Sheets

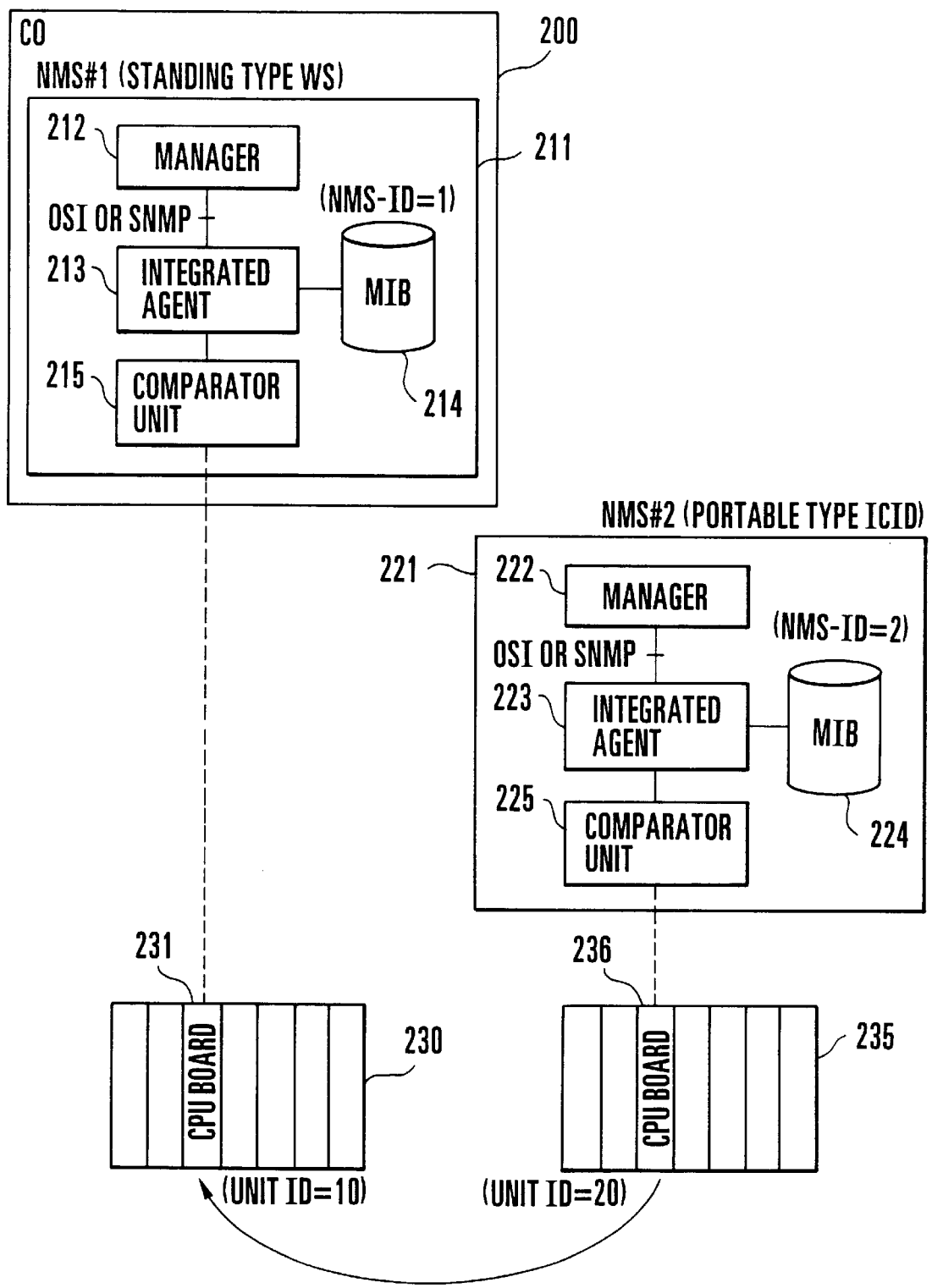
F I G. 2

FIG. 6

| PATTERN | CONSTITUTIONAL INFORMATION<br>a) NMS ID + TIME STAMP INFORMATION<br>b) UNIT ID | PREDICTABLE SITUATION | SYSTEM MAKEUP PROCEDURE |
|---|---|---|---|
| 1 | a) COINCIDENCE<br>b) NON-COINCIDENCE | EXCHANGE OF NE (CPU BOARD) (MANAGED BY THE SAME NMS BEFORE EXCHANGE) | WORKING PERMITTED WITHOUT ALTERATION (CHANGE OF ONLY UNIT ID IS NEEDED) |
| 2 | a) COINCIDENCE<br>b) COINCIDENCE | INSTANTANEOUS INTERRUPTION OF POWER SUPPLY OF NE OR NMS (NE AND NMS REMAIN UNCHANGED BEFORE AND AFTER POWER FAILURE) | WORKING PERMITTED WITHOUT ALTERATION |
| 3 | a) NON-COINCIDENCE<br>b) NON-COINCIDENCE | EXCHANGE OF NE (CPU BOARD) (MANAGED BY DIFFERENT NMS BEFORE EXCHANGE) | DOWN-LOAD (INITIALIZATION OF NE IS NEEDED) |
| 4 | a) NON-COINCIDENCE<br>b) COINCIDENCE | CONNECTION SWITCHING BETWEEN NMS#1 (2) AND NMS#2 (1) (INITIAL MAKEUP OF NMS#1 AND MNS#2 IS COMPLETED) | UP-LOAD (REPRODUCTION OF MIB IS NEEDED) |
| 5 | a) VALUE ACQUIRED FROM NE IS NULL<br>b) VALUE ACQUIRED FROM NE IS NULL | INITIAL MAKEUP OF NE | DOWN-LOAD (REPRODUCTION OF MIB AND INITIALIZATION OF NE ARE NEEDED) |

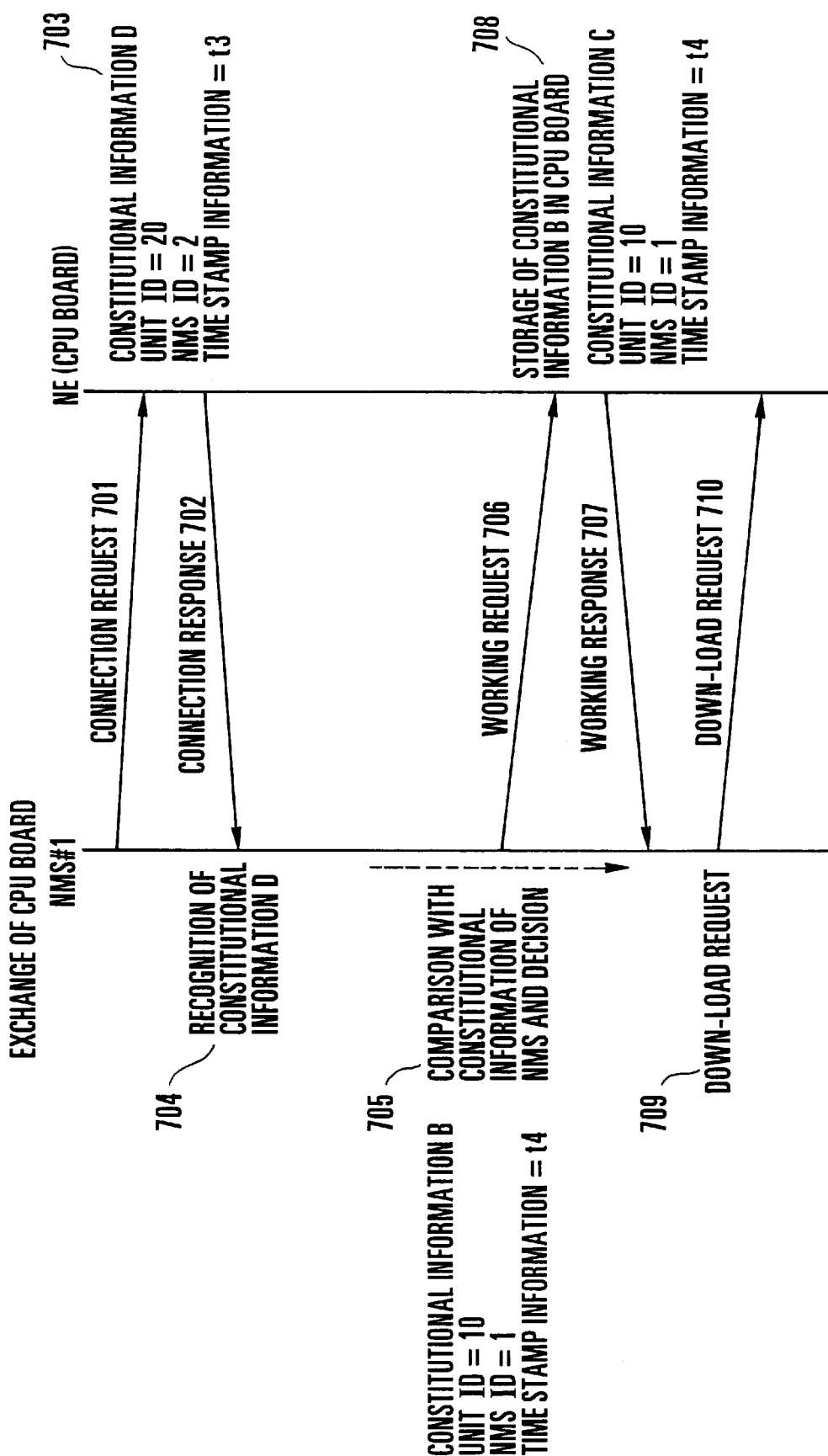

METHOD OF FORMING MULTI-INTEGRATED AGENT SYSTEM

BACKGROUND OF THE INVENTION

The present invention relates to a method of forming a multi-integrated agent system and more particularly, to a method of forming a multi-integrated agent system applicable to a network management system (NMS) which performs management with an agent packaged in a work station (WS) by using open systems interconnection (OSI) or simple network management protocol (SNMP) and applicable to a network element (NE) which is an object to be managed by the NMS.

Generally, in the NMS which performs network management in the mode in which the agent is packaged in the WS by using the OSI or the SNMP, when a fault occurs in a network or in various NETs to be managed by the NMS or when maintenance work is desired to be carried out, the connection of an NE managed by a standing NMS is switched to an intelligent craft interface device (ICID) brought to the spot in order that the fault can be monitored or a CPU board of the abnormal NE can be exchanged.

Accordingly, when the fault recovery work and maintenance work as above are carried out, especially, when monitoring is effected, the ICID and the NE must be created and after completion of the work, the NMS and NE must be created.

In the past, when the NMS or the ICID and NE are desired to be created in the above multi-integrated agent system, suitable formation must be effected in accordance with different situations.

For example, when the management process practiced by an NMS which is standing in a central office (CO) of a network management center is switched to an ICID at the spot where a given NE is installed, a managed object (MO) instance concerning the NE to be managed does not exist or an MO instance indicative of old information in the previous connection exists and therefore, an operator must up-load the present state from a CPU board in the NE to be managed so as to update a management information base (MIB) set in the ICID to be newly connected, through an explicit manual operation.

Also, when a CPU board packaged in an NE is desired to be exchanged during working of an NMS, information stored in the newly inserted CPU board is in the initial state or in a state conforming to an NE in which the CPU board has been packaged before the exchange and therefore, an operator must explicitly down-load information of an MIB of the NMS into a memory of the CPU board through a manual operation.

Further, the combination of the connection switching between a NMS and an ICID with the exchange of a CPU board packaged in an NE will be described. Then, for example, when the connection is desired to be switched to the ICID during working of the NMS and besides the exchange of the CPU board is desired, various combinations are available at the actual work spot and therefore, an operator decides whether a suitable formation method is down-loaded or up-loaded at the spot for each combination and deals with the procedure through a manual operation.

Accordingly, the conventional multi-integrated agent system formation method faces problems as below.

Firstly, in the conventional forming method, the NMS, ICID and NE (CPU board) are independent of each other and therefore they do not recognize their own states and what procedure is needed for proper information, with the result that unless a person (operator) decides, depending on a situation at that time, which of a down-load or an up-load must be effected to form the NMS and NE and proceeds with suitable procedures, the NMS and NE cannot be formed.

Secondly, when the connection switching and the exchange are carried out in various combinations among the NMS, ICID and CPU for the sake of maintenance and consequently, the operator cannot grasp what the present state is, formation and initial setting of the NMS (or ICID) and NE must be done from the beginning.

Thirdly, in the conventional forming method, the procedure is such that even in the event of an instantaneous interruption of the power supply of the NE, working is immediately started as soon as connection is spread between the NMS and the NE to permit immediate working and therefore, it is impossible for the NE, ICID and CPU board to discriminate among the connection switching between the NE and ICID, the exchange of the CPU board and the instantaneous interruption of the power supply of the NE, so that the working is started immediately with the contents of the MBI unchanged or with the information in the memory of the CPU board unchanged and there is a danger that the working of the network management is started with the information of the NMS (or ICID) discrepant from that of the NE.

SUMMARY OF THE INVENTION

An object of the present invention is to provide a multi-integrated agent system formation method which can automate and simplify the procedure for making-up the NMS or ICID and the NE to improve the maintainability and operationability of the network arrangement and mitigate the work load.

To accomplish the above object, according to the present invention, in a method of forming a multi-integrated agent system having a network management system and a network element, each of the network management system and network element has predetermined structural information being indicative of a structure of a system and including management system identifying information for identifying the network management system, element identifying information for identifying the network element and time information indicative of a time point at which the network management system and the network element are connected to each other and holds the structural information, and the network management system performs formation of the system in accordance with a predetermined formation procedure based on the structural information collected from the network element and the structural information held by itself.

The network management system compares the structural information collected from the network element with the structural information held by itself and when management system identifying information and time information of one structural information coincides with those of the other structural information and element identifying information of one structural information does not coincide with that of the other structural information, new element identifying information is assigned to the network element and the working continues without alteration.

Further, the network management system compares the structural information collected from the network element with the structural information held by itself, and when management system identifying information and time information of one structural information coincide with those of the other structural information and element identifying information of one structural information coincides with that of the other structural information, the working continues without alteration.

Further, the network management system compares the structural information collected from the network element with the structural information held by itself, and when management system identifying information or time information of one structural information does not coincide with that of the other structural information and element identifying information of one structural information coincides does not coincide with that of the other structural information, the network element is initialized.

Further, the network management system compares the structural information collected from the network element with the structural information held by itself, and when management system identifying information or time information of one structural information does not coincide with that of the other structural information and element identifying information of one structural information coincides with that of the other structural information management information owned by the network element is collected.

Further, when management system identifying information, time information or element identifying information of the structural information collected from the network element is undetermined, the network management system initializes the network element and collects management information owned by the network element.

BRIEF DESCRIPTION OF THE DRAWINGS

FIG. 2 is a block diagram showing a multi-integrated agent system according to another embodiment of the present invention.

FIG. 6 is a diagram for explaining formation decision criteria in the NMS.

FIG. 7 is a sequence diagram showing a process operation when a CPU board of the NE is exchanged.

DESCRIPTION OF THE PREFERRED EMBODIMENTS

The present invention will now be described by way of example with reference to the accompanying drawings.

Figure 1:
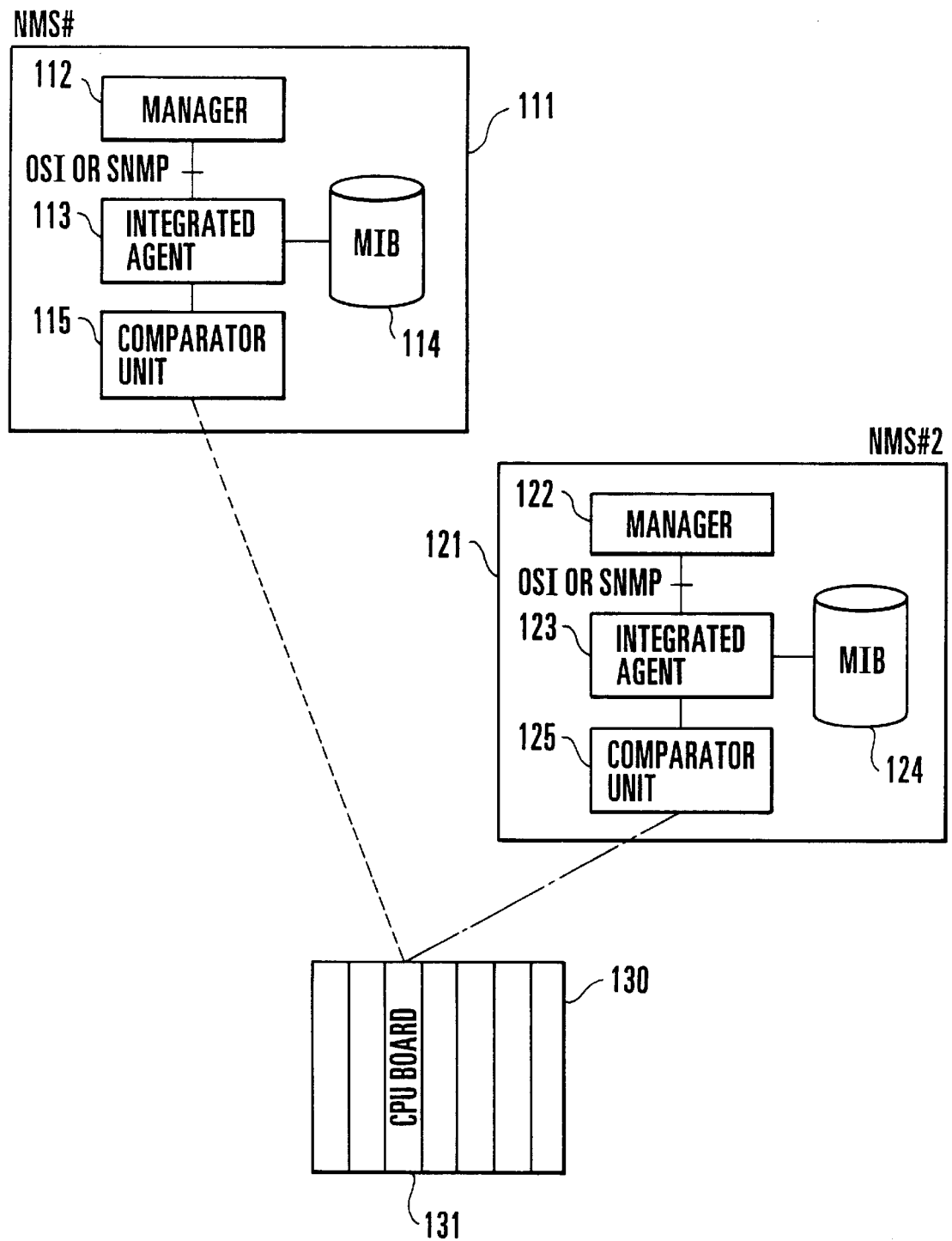
FIG. 1 is a block diagram showing a multi-integrated agent system according to an embodiment of the present invention.

Referring to FIG. 1, there is illustrated in block form a multi-integrated agent system according to an embodiment of the invention. In the figure, a network management system (NMS) 111 (NMS #1) includes a manager 112 for managing a network and a network element (NE) 130, an integrated agent 113 which is an object to be managed by the manager 112 through an interface such as an open systems interconnection (OSI) or a simple network management protocol (SNMP), and a management information base (MIB) 114 for storing management object instances handled by the integrated agent 113.

The NMS 111 further includes a comparator unit 115 for performing communication with the NE to compare structural information stored in the MIB with structural information acquired from the NE and deciding an optimal formation procedure for the NMS 111 and the NE.

There is also illustrated another NMS 121 (NMS #2) having the same construction as that of the NMS 111.

The NE 130 is packaged with a CPU board 131 for hardware management and communication with the NMS so that each of the NMS 111 and 121 may manage the NE 130 by communicating with the CPU board 131 and interchanging data stored therein.

Each of the MIB 114 of NMS 111, MIB 124 of NMS 121, and CPU board 131 of NE 130 stores structural information including a unique identifier and a time point at which connection is established.

The operation of the present embodiment of the invention will now be described.

Figure 3:
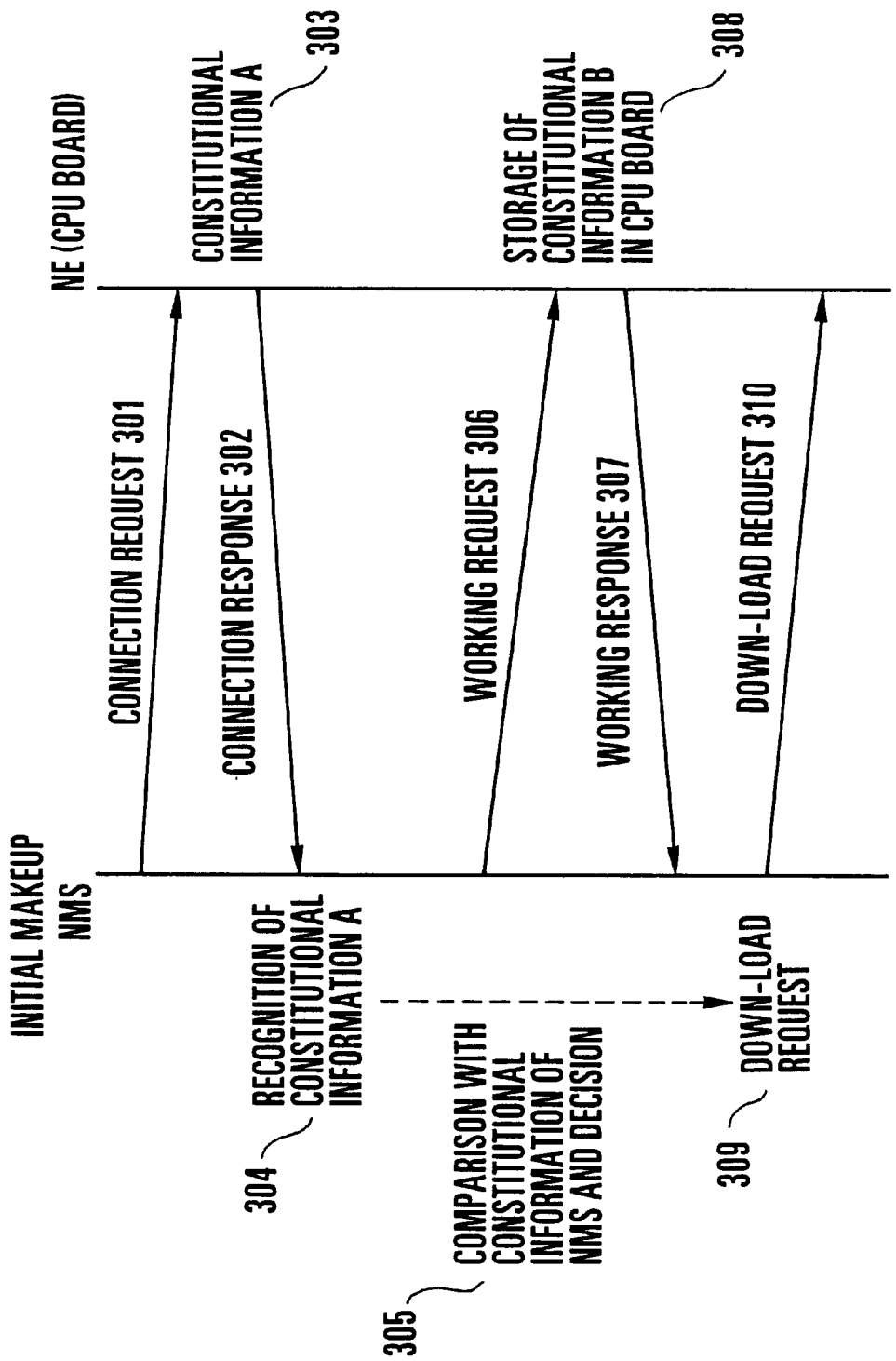
FIG. 3 is a sequence diagram showing a process operation when initial formation of a NMS and a NE is carried out.

Referring to FIG. 3, a process operation of initial formation of the NMS and NE will first be described. FIG. 3 is a sequence diagram showing the process operation when the NMS and NE is initially formed.

When the NMS 111 and NE 130 are initially formed (namely, when any management information has not yet been set in the MIB 114 and CPU board 131), the NMS 111 first transmits to the NE 130 a request 301 for connection of a management network and responsive to the connection request, the NE 130 transmits a connection response 302 including structural information A 303 to the NMS 111.

The structural information A 303 includes a unit ID (element identifying information), a NMS-ID (management system identifying information) and time stamp information (time information) and because the NE is placed in initial condition, values of these information pieces are all null (undetermined or initial values).

Acquiring the structural information A 303, the NMS 111 recognizes (304) the contents of the information A and decides (305) what procedure is optimal for performing formation of the system.

Then, the NMS 111 transmits to the NE a working request (306) containing an ID (unit ID) for the NE 130, an ID of the NMS (NMS-ID) and date/hour (time stamp information) which are determined by an application program of the NMS 111.

On the assumption that the above structural information is structural information B, the NE 130 stores (308) the structural information B in the memory of the CPU board 131 and transmits a response 307 to the structural information B to the NMS 111.

Receiving this response, the NMS 111 applies a necessary procedure to the NE 130 in accordance with the previously determined optimal formation procedure (309).

In this example, since both the NMS 111 and NE 130 are subjected to the first formation, the NMS 111 transmits a request (310) for down-load to the NE 130 and generates information of the MIB 114.

Figure 4:
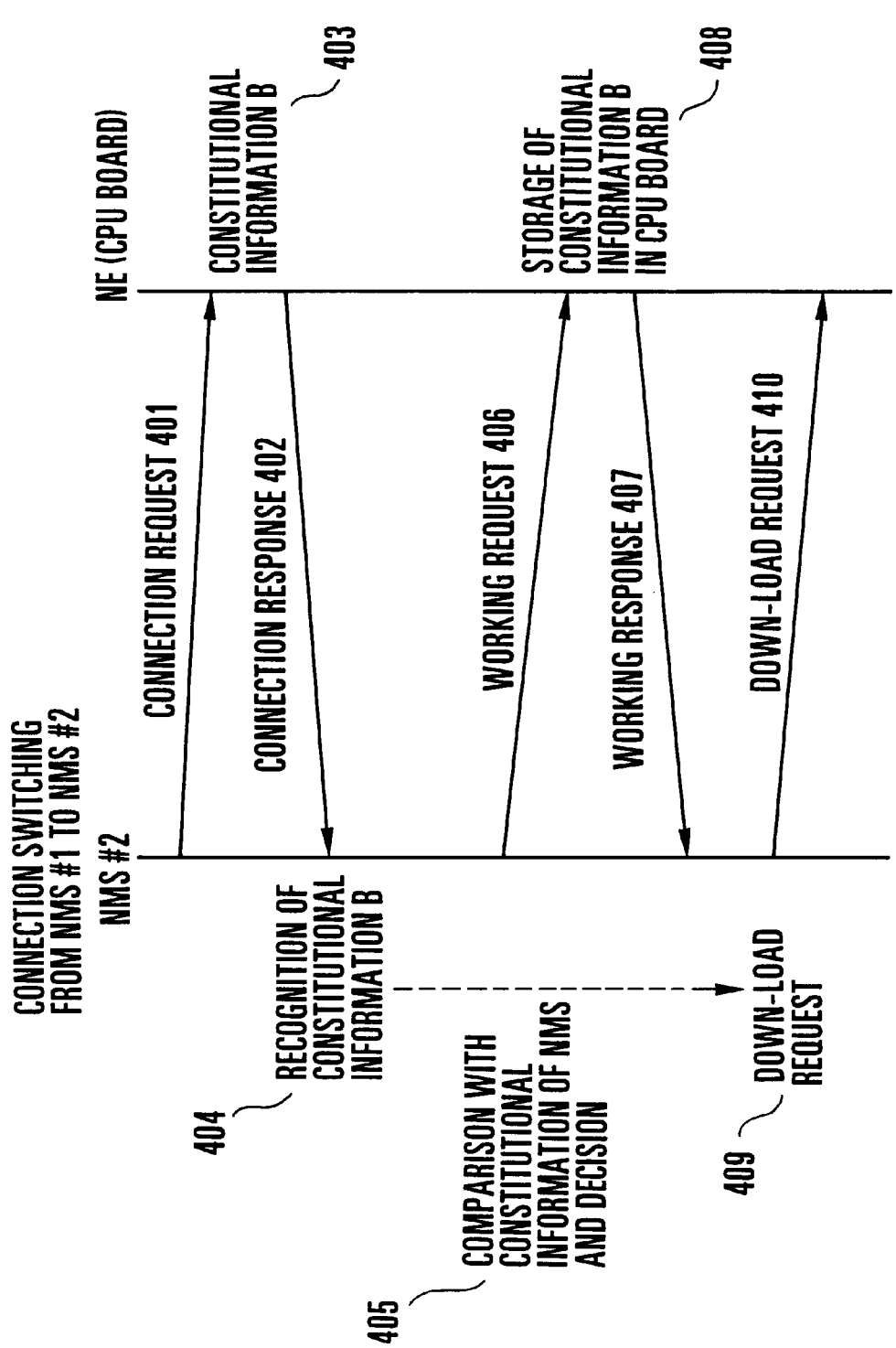
FIG. 4 is a sequence diagram showing a process operation when the connection of a management network is switched to another NMS.

Referring now to FIG. 4, a process operation carried out when the connection of the management network is switched to another NMS while keeping the CPU board of the NE unchanged will be described. FIG. 4 is a sequence diagram showing the process operation for switching the management network to another NMS.

When the connection of the management network is switched from the NMS 111 to the NMS 121, an interruption of the management network due to physical connection switching spontaneously occurs and as a result, a request (401) for connection of the management network is transmitted from the NMS 121 to the NE 130.

Since the structural information B set by the NMS 111 during the first formation has been stored in the CPU board 131 of the NE 130, the NE 130 transmits to the NMS 121 a connection response 402 which contains the structural information B.

Recognizing the structural information B, the NMS 121 compares the structural information B with structural information stored in the MIB 124 of its own and decides an optimal formation procedure.

In this example, the NMS-ID contained in the structural information B is not an ID of the NMS 121 after the switching of the connection of NMS but is the ID of the NMS 111 before the connection switching and therefore, the NMS 121 recognizes the occurrence of the switching of the connection of NMS and determines that a formation procedure based on the up-load process is optimal.

Accordingly, the NMS 121 transmits to the NE 130 a working request 406 containing an ID (unit ID) for the NE 130 and an ID of the NMS 121 (NMS-ID) and date/hour (time stamp information) which are determined by an application of the NMS 121.

In this example, the unit ID is the same as that of the structural information B but the NMS-ID and time stamp information have new values.

Here, on the assumption that the above structural information is structural information C, the NE 130 stores the structural information C in the memory of the CPU board 131 and responsive to the request from the NMS 121, transmits a working response 407 to the NMS 121.

Receiving the response, the NMS 121 applies a necessary procedure to the NE 130 in accordance with the previously determined optimal formation procedure (409).

In this example, since the connection is switched from NMS 111 to NMS 121, the NMS 121 acquires management information stored in the CPU board 131 of the NE 130 by transmitting a down-load request 410 to the NE 130 and reproduces information of the MIB 124 of the NMS 121 on the basis of that management information.

In this manner, each of the MIB's 114 and 124 of the respective NMS 111 and 121 and the CPU board 131 of the NE 130, the NMS's 111 and 121 and the NE 130 constituting the multi-integrated agent system, hold the structural information including the NMS-ID indicative of information for identifying each NMS, the time stamp information indicative of a time at which each of the NMS's 111 and 121 connects to the individual NE's and the unit ID indicative of information for identifying the NE, and each of the NMS's 111 and 121 collects the structural information from each of the NE's 130 and compares the collected structural information with structural information of its own by means of the comparator unit 115 or 125 to practice a proper forming procedure in accordance with a comparison result.

Accordingly, in contrast to the conventional method in which the person (operator) deals by deciding, in accordance with a situation at that time, which of a down-load or an up-load is to be carried out to make-up the NMS and NE, the procedure for forming the NMS or ICID and NE can be automated and simplified, thus improving maintainability and operationability of the network management and mitigating the work load.

Referring now to FIG. 2, another embodiment of the present invention will be described.

FIG. 2 is a block diagram showing a multi-integrated agent system according to another embodiment of the present invention.

Typically, the network management is carried out using a desk top type work station (WS) which is standing in a central office (CO) and a portable WS as shown in FIG. 2, the portable WS being brought to a spot where an NE is installed when a trouble occurs or when installation or migration of the NE is effected.

Here, the standing WS arranged in the CO 200 is represented by a NMS 211 (NMS #1) and the portable WS is represented by a NMS 221 (NMS #2).

The NMS 211 includes a manager 212 for managing a network and a NE through an interface of OSI or SNMP, an integrated agent 213 which is an object to be managed by the manager and a MIB 214 for storing management object instances handled by the integrated agent 213.

The NMS 211 further includes a comparator unit 215 for communicating with a NE 230 to compare structural information stored in the MIB 214 with that acquired from the NE 230 and deciding an optimal formation procedure for the NMS 211 and NE 230.

It is to be noted that the NMS 221 has the same construction as the NMS 211. Here, an identifier NMS-ID for the NMS 211 is "1" and an identifier NMS-ID for the NMS 221 is "2".

On the other hand, the NE 230 is packaged with a CPU board 231 for hardware management and communication with the NMS 211.

The NMS 211 communicates with the CPU board 231 and manages the NE 230 by interchanging data stored in the CPU board.

The CPU board 231 has a means for storing, on a memory, structural information including a unique identifier (unit ID) set by the NMS 211 and a time at which the connection is established.

Next, the operation of the present embodiment will be described with reference to the drawings.

Figure 5:
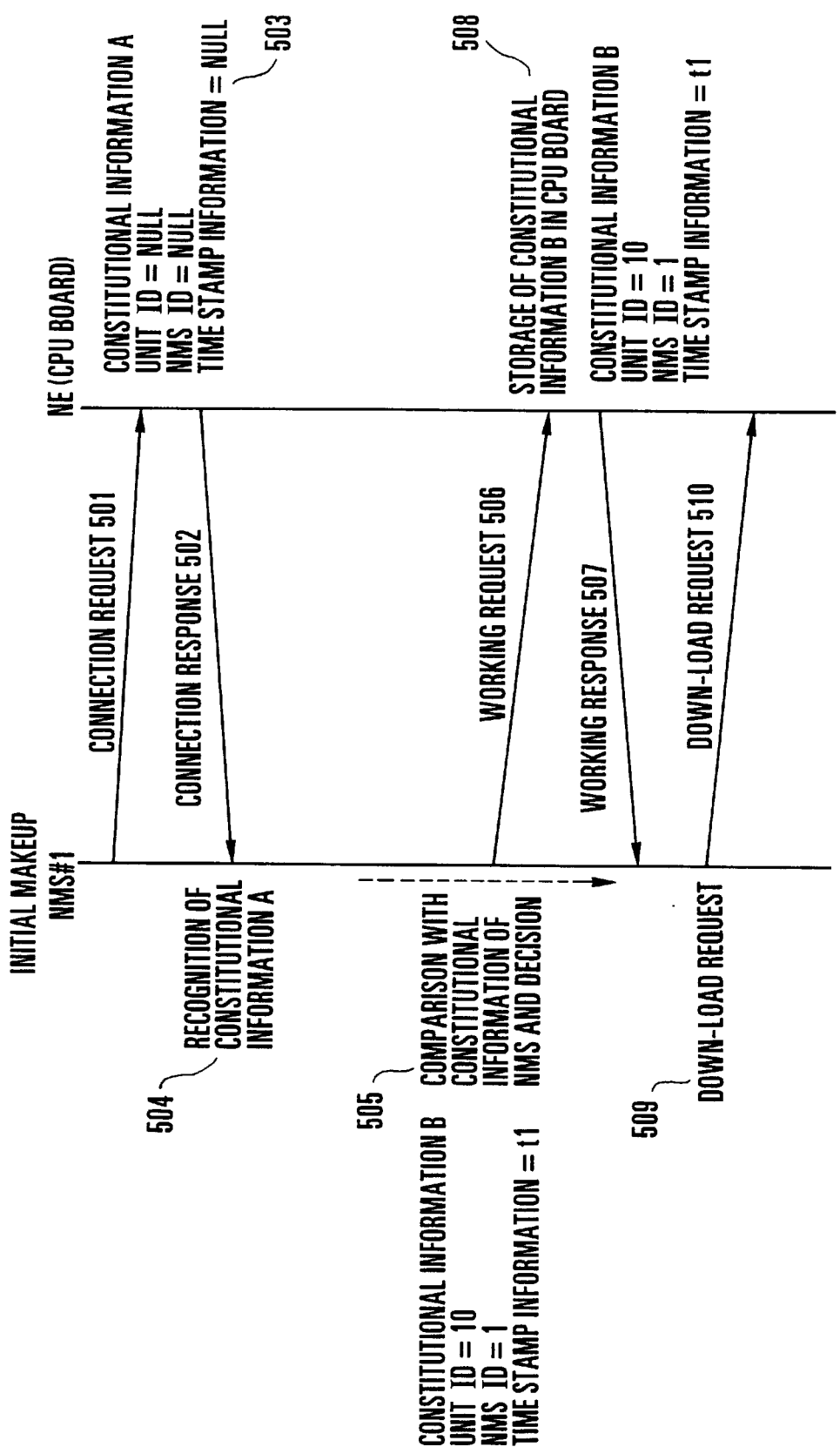
FIG. 5 is a sequence diagram showing another process operation when formation of the NMS and NE is carried out.

Referring first to FIG. 5, a process operation when initial formation of the NMS and NE is carried out will be described. FIG. 5 is a sequence diagram of the process operation for performing the initial formation of the NMS and NE.

The NMS 211 transmits a request 501 for connection of a management network to the NE 230 and responsive thereto, the NE 230 transmits a connection response 502 containing structural information A to the NMS 211.

Here, the structural information A includes a unit ID, a NMS-ID and time stamp information but because the NE 230 is placed in initial condition, values of these information pieces are all null (undetermined) (see 503 in FIG. 5).

Acquiring the structural information A, the NMS 211 recognizes (504) the contents and decides what procedure is optimal for formation of the system.

In this case, since the unit ID is null, the NMS-ID is null and the time stamp information is null, the application program of the NMS 211 determines a pattern 5 from decision criteria shown in FIG. 6 to indicate that for forming of the system, down-load is to be carried out and a management information instance of NE 230 corresponding to the MIB 214 in NMS 211 is to be generated.

FIG. 6 is a table for explaining the formation decision criteria in the NMS. The application program of the NMS selects an optimal formation procedure conforming to a situation pursuant to the decision criteria on the basis of the structural information collected from the NE.

Next, the NMS 211 transmits, to the NE 230, a working request 506 containing structural information B having an ID (unit ID) for the NE 230, an ID of the NMS (NMS-ID) and a date/hour (time stamp information) which are determined by the application program of the NMS 211.

The contents of the structural information B is such that the unit ID=10, the NMS-ID=1 and the time stamp information=t1 (present time).

The NE 230 stores the received structural information B in the memory of the CPU board 231 and transmits to the NMS 211 a request response 507 to the request from the NMS 211.

Receiving the response, the NMS 211 transmits a down-load request 510 to the NE 230 in accordance with the previously determined optimal formation procedure 509 and performs a process for generation of a management information instance corresponding to the unit ID=1 in the NMS 211 and a process for initialization of data in the CPU board 231 of the NE 230.

Next, a process operation when the CPU board of the NE is exchanged will be described with reference to FIG. 7. FIG. 7 is a sequence diagram showing the process operation for the exchange of the CPU board of the NE.

For example, an instance is now considered where the CPU board 231 of NE 230 shown in FIG. 2 becomes faulty and a CPU board 236 of another NE 235 worked by a different NMS 221 is brought for physical exchange of CPU board.

When the CPU board 231 of the NE 230 is exchanged, an interruption of the management network due to plug-in and -out of a physical package is spontaneously caused and as a result, the NMS 211 sends to the NE 230 a request 701 for connection of a management network.

Since the CPU board 236 of the NE 235 is stored with structural information D which has been set by the NMS 221 upon the first formation, the NE 230 transmits the structural information D to the NMS 211 through the medium of a connection response 702.

Recognizing the structural information D, the NMS 211 compares, at the comparator unit 215, the structural information D with structural information stored in the MIB 214 of NMS 211 and decides an optimal formation procedure on the basis of a comparison result.

In this example, the structural information D includes the NMS-ID which is an ID of the NMS 221 which has been in charge of the previous working and the unit ID which is an identifier "2" assigned by the NMS 221.

Accordingly, the NMS 211 recognizes that a pattern 3 (see FIG. 6) shown in the decision criteria prevails, that is, the CPU board of the NE 230 is exchanged with a different one which has been worked by the different NMS before the exchange and then determines that a formation procedure by a down-load process and by an initialization process of the NE 230 (CPU board).

Next, the NMS 211 informs the NE of structural information B including an ID (unit ID) for the NE 230, an ID of the NMS (NMS-ID) and date/hour (time stamp information) which are determined by the application program of the NMS 211, through the medium of a working request 706.

In this example, values of unit ID=10, NMS-ID =1 and time stamp information=t4 (present time) are set in the exchanged CPU board 236 of the NE 230.

Thus, the NE 230 stores the structural information B in the memory of the CPU board 236 and transmits a working response 707 to the NMS 211.

Receiving the response, the NMS 211 applies a necessary procedure to the NE 230 in accordance with the previously determined optimal formation procedure 705.

In this example, since the CPU board is exchanged and data of the CPU board 236 must be so reproduced as to match with information of the MIB 214, the NMS 211 transmits a down-load request 710 to the NE 230 in order that management information stored in the CPU board 236 of the NE 230 can be matched with data stored in the MIB 214 of the NMS 211.

Figure 8:
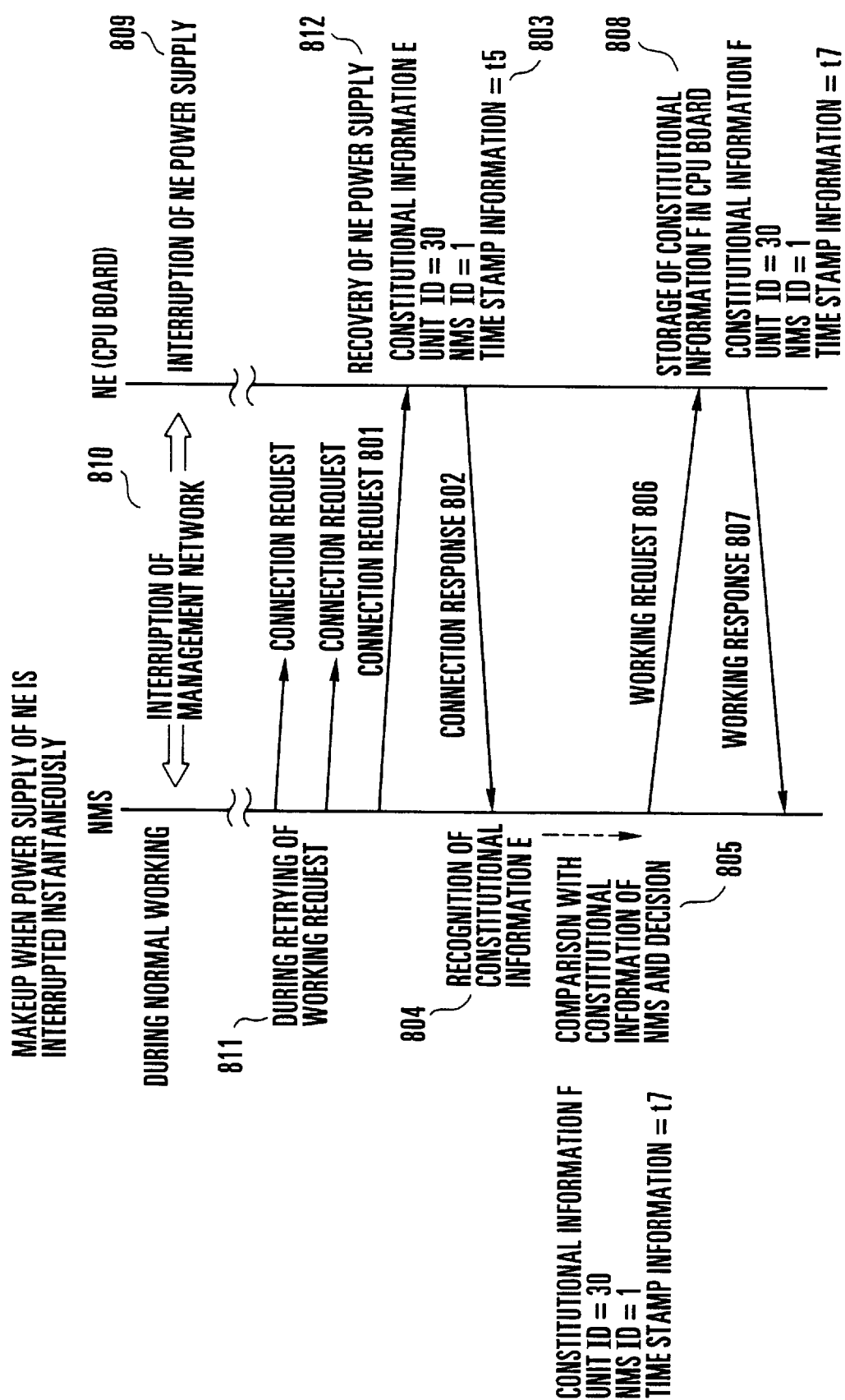
FIG. 8 is a sequence diagram showing a process operation in the event that an instantaneous interruption of the power supply of the NE occurs.

Referring now to FIG. 8, still another embodiment of the present invention will be described.

Typically, a NMS is related to a NE in such a manner that any changes of structure of a network are not effected and connection switching of the NMS and exchange of a CPU board of the NE are not carried out unless any trouble occurs, thus making the same NMS monitor the same NE constantly.

Typically, for example, a non-utility generator is provided in the CO in which the NMS is installed in preparation for an accident such as power failure, thus ensuring that supply of power to the NMS cannot be interrupted.

In contrast, it is frequent that the NE is typically installed near an outdoor road, in a manhole or in a room of a general apartment house and the NE is not always installed in an environments where sufficient countermeasures against an interruption of supply of power to the NE due to a power failure are taken.

Therefore, the NMS is necessarily required to have a formation procedure for rapidly resuming the work of management after he power supply is recovered even in the event of an instantaneous interruption of the power supply of the NE.

Referring now to FIG. 8, still another embodiment of the multi-integrated agent system forming method using the structural management information according to the present invention will be described. The present embodiment is directed to a system forming method usable in the event of an instantaneous interruption of the power supply of the NE.

FIG. 8 is a sequence diagram showing a process operation when the power supply of the NE is instantaneously interrupted.

It is now assumed that in FIG. 2, formation of the NMS 211 and NE 230 ends and the power supply of the NE 230 is interrupted (809) while the normal work management proceeds.

In this case, the management signal network is interrupted and consequently, the NMS 211 recognizes that the power supply of the NE 230 is interrupted.

Recognizing the interruption of the management network, the NMS 211 periodically transmits a connection request 801 and decides (811) whether or not the power supply of the NE is recovered by using the presence or absence of a response to the connection request 801.

When the NE 230 receives the connection request 801 from the NMS 211 after recovery 812 of the power supply of the NE 230, it transmits, as a connection response 802, structural information E 803 which is stored in the CPU board 231 of the NE 230.

Receiving the connection response, the NMS 211 recognizes the contents of the structural information E and decides which pattern shown in the decision criteria (see FIG. 6) the structural information conforms to.

In this example, the structural information E includes a unit ID=30, a NMS-ID=1 and time stamp information=t5 and coincides with structural information stored in the NMS 211.

Accordingly, it is determined that exchange of the NMS and CPU board is not required under the condition of the pattern 2 and so a state 805 is available in which the system can be brought rapidly into a working state without alteration.

Next, the NMS 211 transmits to the NE 230 a message in the form of a working request 806 including structural information F.

The NE 230 stores the structural information F in the memory of the CPU board 231.

Here, the unit ID and NMS-ID of the structural information F coincide with those of the structural information E but only the time stamp information is updated at the time that the working request is transmitted.

Th rough this, the NMS 211 receiving the working response from the NE 230 can rapidly resume the management working of the object NE by means of up-load and down-load without performing the processing for matching the management information of the NMS 211 with that of the NE 230.

As described above, in the present invention, each of the network management system and the network element has predetermined structural information being indicative of a structure of a system and including management system identifying information for identifying the network management system, element identifying information for identifying the network element and time information indicative of a time point at which the network management system and the network element are connected together and holds the structural information, and the system is formed in accordance with a predetermined formation procedure based on the structural information collected from the network element and the structural information held by the network management system.

Accordingly, in contrast to the conventional method in which a person (operator) decides, in accordance with a situation at that time, whether a download or an up-load is to be done for the purpose of making-up the network management system and network element, the procedure for forming the multi-integrated agent system can be automated and simplified to thereby improve maintainability and operationability of the network management and mitigate the work load.

Further, the structural information collected from the network element is compared with the structural information held by the network management system and when management system identifying information and time information of one structural information coincide with those of the other structural information and element identifying information of one structural information does not coincide with that of the other structural information, the network element is assigned with new element identifying information and working continues without alteration, so that even when the network element, for example, the CPU board which has been managed by the same network management system before exchange is exchanged, new element identifying information can be assigned to the exchanged network element and the multi-integrated agent system can be formed properly.

Further, when management system identifying information and time information of one structural information coincides with those of the other structural information and element identifying information of one structural information coincides with that of the other structural information, the working proceeds without alteration, so that even when the power supply of the network management system or the network element is instantaneously interrupted, the multi-integrated agent system can be formed properly.

Further, when management system identifying information or time information of one structural information does not coincide with that of the other structural information and element identifying information of one structural information does not coincide with that of the other structural information, the network element is initialized, so that even when the network element, for example, the CPU board which has been managed by a different network management system before exchange is exchanged, the multi-integrated agent system can be formed properly.

Further, when management system identifying information or time information of one structural information does not coincide with that of the other structural information and element identifying information of one structural information coincides with that of the other structural information, management information owned by the network element is collected, so that even when connection of the network management system is switched, the management information owned by the network element is collected by a new network management system and the multi-integrated agent system can be formed properly.

Further, when management system identifying information, time information or element identifying information of the structural information collected from the network element are undetermined, the network element is initialized and the management information owned by the network element is collected, so that even when a new network element is connected, the new network element can be initialized and the management information owned by that network element can be collected and managed by the network management system, thereby enabling the multi-integrated agent system to be formed properly.

What is claimed is:

1. A method of forming a multi-integrated agent system having a network management system for performing management with an agent packaged in a work station by using open systems interconnection or simple network management protocol and a network element to be managed by the network management system, wherein each of said network management system and said network element has predetermined structural information that is indicative of a structure of said multi-integrated system, said structural information including management system identifying information for identifying said network management system, element identifying information for identifying said network element and time information indicative of a time point at which said network management system and network element are connected to each other, and each of said network management system and said network element stores the structural information, said network management system performing the step of forming the multi-integrated agent system in accordance with a predetermined procedure based on the structural information collected from said network element and the structural information held by itself, comparing the structural information collected from said network element with the structural information held by itself, and when management system identifying information and time information of one structural information coincides with those of the other structural information and element identifying information of one structural information does not coincide with that of the other structural information, assigning new element identifying information to said network element and the working continues without alteration.

2. A multi-integrated agent system forming method according to claim 1, wherein said network management system further performs the steps of:

comparing the structural information-nation collected from said network element with the structural information held by itself, and when management system identifying information and time information of one structural information coincide with those of the other structural information and element identifying information of one structural information coincides with that of the other structural information, the working continues without alteration.

3. A multi-integrated agent system forming method according to claim 1, wherein said network management system further performs the steps of:

comparing the structural information collected from said network with the structural information held by itself, and when management identifying information or time information of one structural information does not coincide with that of the other structural information and element identifying information of one structural information does not coincide with that of the other structural information, initializing said network element.

4. A multi-integrated agent system forming method according to claim 1, wherein said network management system further performs the steps of:

comparing the structural information collected from said network element with the structural information held by itself, and when management system identifying information or time information of one structural information does not coincide with that of the other structural information and element identifying information of one structural information coincides with that of the other structural information, collecting management information owned by said network element.

* * * * *